United States Patent Office

Re. 27,722
Reissued Aug. 7, 1973

27,722

CROSSLINKING OF UNSATURATED POLYESTERS WITH N-3-OXOHYDROCARBON-SUBSTITUTED ACRYLAMIDES

Thomas C. Jennings, Willowick, Ohio, assignor to The Lubrizol Corporation, Wickliffe, Ohio No Drawing. Original No. 3,616,370, dated Oct. 26, 1971, Ser. No. 5,105, Jan. 22, 1970, which is a continuation-in-part of abandoned applications Ser. No. 801,794, Feb. 24, 1969, and Ser. No. 877,041, Nov. 14, 1969. Application for reissue Jan. 24, 1972, Ser. No. 220,500
Int. Cl. C08f *21/00, 21/02*
U.S. Cl. 204—159.15 24 Claims

Matter enclosed in heavy brackets [ ] appears in the original patent but forms no part of this reissue specification; matter printed in italics indicates the additions made by reissue.

ABSTRACT OF THE DISCLOSURE

N-3-oxohydrocarbon-substituted acrylamides, especially diacetone acrylamide, are used as cross-linking monomers for unsaturated polyesters, either alone or in combination with known cross-linking monomers such as styrene and diallyl phthalate. The curable compositions thus formed may be used in the preparation of nonblocking "prepregs" which, upon stacking and molding, form laminates with excellent properties. They are also suitable for forming physically or chemically thickened premixes. In the chemically thickened ones, which employ a metal salt or hydroxide as a reactive thickener, an acidic reagent (usually a polymerizable acid such as methacrylic acid) may be used to accelerate B-stage resin formation.

This application is a continuation-in-part of copending applications Ser. No. 801,794, filed Feb. 24, 1969, and Ser. No. 877,041, filed Nov. 14, 1969 both now abandoned.

This invention relates to new polymeric compositions of matter, and in particular to mixtures of curable polyesters with cross-linking agents therefor. Still more particularly, the compositions of this invention comprise an unsaturated polyester and a cross-linking medium comprising (A) about 30–100 parts by weight of a monomeric N-3-oxohydrocarbon-substituted acrylamide having the formula

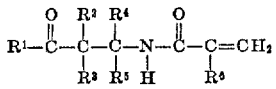

wherein each of $R^1$, $R^2$, $R^3$, $R^4$ and $R^5$ is hydrogen or a hydrocarbon radical and $R^6$ is hydrogen or a lower alkyl radical, with (B) about 0–70 parts by weight of a second monomer capable of cross-linking said polyester.

The preparation of curable unsaturated polyesters is well known in the art. These compositions are usually formed by the reaction of a diol or polyol such as glycerol, ethylene glycol, diethylene glycol, propylene glycol, dipropylene glycol, bisphenol A, neopentyl glycol or trimethylpentanediol with an unsaturated, polymerizable dicarboxylic or polycarboxylic acid or anhydride thereof (e.g., maleic, fumaric, itaconic or citraconic). Frequently, the polymerizable acid is used in admixture with a nonpolymerizable acid or anhydride such as phthalic, isophthalic, terephthalic, adipic, azelaic, sebacic, chlorendic, tetrabromophthalic, tetrachlorophthalic, hexachloro-octahydromethanonaphthalenedicarboxylic acid or "Nadic" anhydride (the adduct of maleic anhydride with cyclopentadiene). Other acids or anhydrides, including inorganic ones such as phosphorus pentoxide, may be added in certain circumstances.

The reaction of the acids and hydroxy compounds disclosed above results in a linear condensation polymer containing multiple unsaturated centers which are capable of further reaction by addition copolymerization with reactive monomers. The polyesters are frequently sold as solutions in such monomers or in diluents also containing such monomers. Typical monomers are styrene, α-methylstyrene, vinyltoluene, diallyl phthalate, divinylbenzene, methyl methacrylate, triallyl cyanurate and chlorostyrene. To avoid premature cross-linking a small amount of a polymerization inhibitor such as hydroquinone may be added to the mixture. When a polymerization initiator, ordinarily a peroxide catalyst, is added, the unsaturated centers in the polyester react with the monomer to form a complex, three-dimensional polymer which is insoluble and infusible.

Polyesters prepared in this way are frequently reinforced with an inert reinforcing agent or filler such as cotton flock, cellulose flock, wood flour, asbestos fiber, glass fiber, asbestos shorts, Asbestine, cellulose, slate flour, calcium carbonate or paper. In one method of working with such reinforced polyesters, a particulate filler is added to the mixture of polyester and monomer which is then cured during formation of the desired article by sheet molding, extrusion or the like. In a second known method, a reactive metal salt or hydroxide such as calcium hydroxide, magnesium hydroxide, barium hydroxide or zinc hydroxide is substituted for at least part of the filler. This salt or hydroxide reacts with the free carboxyl groups of the polyester to form a thickened composition known as a "B-stage" resin which is then formed into the desired article as above, during which time the cross-linking reaction takes place. In still a third method, a continuous or partially continuous reinforcing medium, such as a glass fiber mat or one or a plurality of paper layers, is impregnated with the polyester composition to form a "prepreg." A laminated article is then produced by stacking the desired number of "prepreg" layers and molding at a relatively high temperature, during which time cross-linking takes place.

Glass fiber-reinforced polyesters, prepared either by premixing or by "prepreg" formation, are of wide use in the automotive field and in boats, airplane parts, construction, consumer items such as appliance housings and bathtubs, electrical insulation, corrosion-resistant tanks, pipes, ducts, etc. Paper-reinforced polyesters can be used to form "prepregs" which can be converted into structural or decorative laminates.

Many of the cross-linking agents in common use, notably diallyl phthalate, form tacky "prepregs" which adhere to each other and to other surfaces when stacked, a phenomenon known as "blocking." This when detracts seriously from the handling characteristics of the "prepregs" and often makes them very difficult and even impossible to work with.

A principal object of the present invention, therefore, is to prepare curable polyester compositions with improved properties.

A further object is to prepare polyester compositions which may be formed into nontacky easily handled premixes and "prepregs."

Still another object is to prepare curable polyesters capable of being cross-linked into hard, resistant and otherwise useful articles.

Other objects will in part be obvious and will in part appear hereinafter.

The unsaturated polyesters suitable for use in the compositions of this invention are so well known in the art as to make detailed description unnecessary. They may be prepared from acidic and alcoholic reagents of the type enumerated hereinabove. Typically, about 2.0–2.5 moles of the diol or polyol is reacted with about 0.4–2.0 moles of the polymerizable acid and about 0–1.6 moles of the nonpolymerizable acid. Although the nonpolymerizable acid is theoretically an optional ingredient, its presence is usually required as a practical matter because of the improved physical properties it lends to the finished product. For a brief description of the preparation of unsaturated polyesters and the best reagents to use to obtain various properties therein, reference is made to the 1968 Modern Plastics Encyclopedia, pp. 229–231.

The critical aspect of the present invention is the chemical identity of the cross-linking medium. According to the invention, this medium comprises, at least in part, an N-3-oxohydrocarbon-substituted acrylamide of the formula

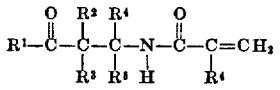

wherein each of $R^{1-15}$ is hydrogen or a hydrocarbon radical and $R^6$ is hydrogen or a lower alkyl radical. As used herein, the term "hydrocarbon radical" includes aliphatic, cycloaliphatic and aromatic (including aliphatic-substituted aromatic and aromatic-substituted aliphatic) radicals. Substituted hydrocarbon, alkyl, aryl, etc., radicals are considered to be fully equivalent to the hydrocarbon, alkyl, aryl, etc., radicals and to be part of this invention. By "substituted" is particularly meant radicals containing relatively inert substituents such as ether (especially lower alkoxy), ester (especially lower carbalkoxy), keto, nitro, halogen and the like so long as these substituents do not alter significantly the character or reactivity of the radical. In general, no more than about three such substituent groups will be present for each 10 carbon atoms in the radical.

The following are illustrative of hydrocarbon and substituted hydrocarbon radicals within the scope of this invention.

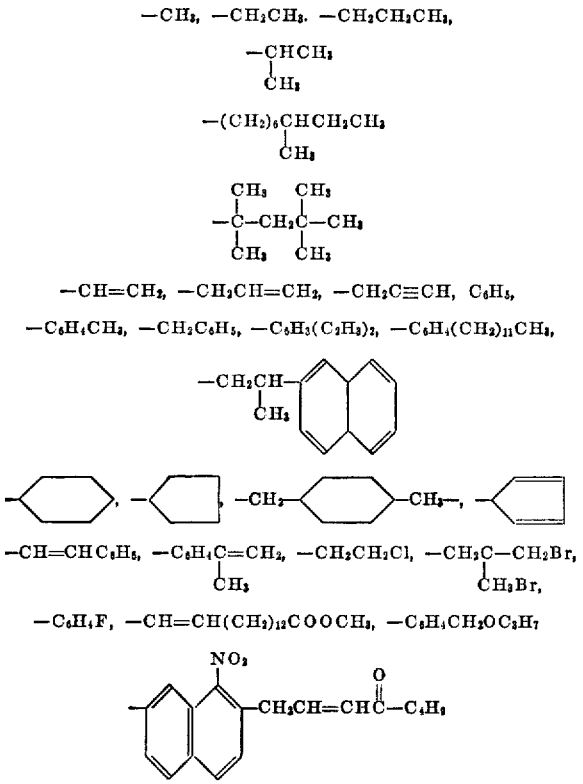

Preferably, $R^{1-15}$ are lower hydrocarbon radicals, the word "lower" denoting radicals containing no more than about 12 carbon atoms. Still more preferably, they are lower alkyl or aryl radicals, most often alkyl, $R^6$ is preferably hydrogen or methyl, usually hydrogen.

Suitable N-3-oxohydrocarbon-substituted acrylamides for use in this invention are disclosed in U.S. Pat. Nos. 3,277,056 and 3,425,942. Illustrative compounds are N-(1,1-dimethyl-3-oxobutyl)acrylamide, or diacetone acrylamide; (N-(1,1-dimethyl-3-oxobutyl)methacrylamide, or diacetone methacrylamide; and N-(1,3-diphenyl-1-methyl-3-oxopropyl)acrylamide, or diacetophenone acrylamide. Diacetone acrylamide is preferred because of its ready availability and will be referred to hereafter in this specification, but it should be understood that other N-3-oxohydrocarbon-substituted acrylamides may be substituted therefor.

A second and optional constituent of the cross-linking medium is a cross-linking monomer selected from the group enumerated hereinabove, such as styrene, diallyl phthalate or the like. The presence of this monomer, and its proportions if present, will depend on the properties desired in the polyester. For "prepreg" formation, diallyl phthalate is often used in combination with diacetone acrylamide since the former serves as a plasticizer for the polyester as well as a cross-linking agent. However, the tackiness of the resin increases with an increase in diallyl phthalate concentration. While the ratio of diallyl phthalate to diacetone acrylamide for any given "prepreg" may vary from 0 at most 7:3, particularly useful compositions are obtained when the ratio is 0 or 1:1.

In the preparation of the curable compositions of this invention, the unsaturated polyester is typically dissolved in a suitable solvent such as acetone, methyl ethyl ketone, ethylene glycol dimethyl ether, or the like. When catalytic curing is employed, a polymerization inhibitor such as hydroquinone is then added, followed by the cross-linking medium and a free radical polymerization catalyst, ordinarily a peroxide such as benzoyl peroxide or t-butyl peroxide. (It is also possible to employ radiation curing, as described hereinafter). The cross-linking medium ordinarily comprises about 5–50 percent by weight of the nonvolatile portion of the mixture (that is, the mixture excluding solvent), while the inhibitor and polymerization catalyst are usually used in amounts of about 0.05–1.0 percent and 0.05–5.0 percent, respectively.

In an alternative method, the cross-linking medium itself, used in excess and heated to at least about 50° C., serves as a solvent for the polyester. At curing temperatures, polyester solutions made in this way have high resin flow and can be cured at low pressures, frequently atmospheric pressure.

For the formations of a "prepreg," the reinforcing medium (which may be fabric, glass fiber, paper or the like) is ordinarily dipped in the resin solution and dried at a temperature no higher than 85° C. Laminates may then be formed by stacking the desired number of reinforced "prepreg" layers and molding at a higher temperature, typically about 125°–250° C. In general, temperatures of this order are necessary since the initial reaction of a polyester with diacetone acrylamide is endothermic. However, if alternate layers contains, respectively, a polymerization catalyst and an accelerator or promoter such as dimethylaniline or cobalt naphthenate, the catalyst and promoter will flow together when the layers are stacked and curing will take place at room temperature or very slightly above. This procedure is particularly useful if the polyester-monomer mixture is quite fluid, as is the case (for example) if one layer contains about 50 percent (by weight) polyester and 50 percent diacetone acrylamide while the adjacent layer contains about 90 percent polyester and 10 percent diacetone acrylamide.

The preparation of "prepregs" containing the curable polyester compositions of this invention, and their use, is illustrated by the following examples in which a commercial polyester prepared from chlorendic anhydride, maleic anhydride and an aliphatic glycol is dissolved in methyl ethyl ketone to form a 75 percent solution. Portions of this resin solution are then combined with diacetone acrylamide, diallyl phthalate and mixtures of the two in various proportions. Sufficient methyl ethyl ketone is added to form a solution containing 80 percent nonvolatile matter, and 0.1 percent hydroquinone (based on the nonvolatile matter) is added thereto. Finally, to the homogeneous solution is added 2 percent (based on nonvolatile matter) t-butyl perbenzoate.

"Prepregs" are prepared by dipping glass fiber fabric in the curable polyester solution, drying for 6 minutes at a maximum temperature of 80° C. and cooling to room temperature with forced air.

Table I gives the compositions of the various curable polyester mixtures evaluated. Examples 1, 4 and 7 are controls using diallyl phthalate (DAP); the other examples are compositions of this invention using diacetone acrylamide or DAP-diacetone acrylamide mixtures. All percentages and ratios are by weight.

TABLE I

| Example | Cross-linking medium | Ratio, resin: cross-linking medium |
|---|---|---|
| 1 | 100% DAP | 60:40 |
| 2 | 50% DAP, 50% diacetone acrylamide | 60:40 |
| 3 | 100% diacetone acrylamide | 60:40 |
| 4 | 100% DAP | 70:30 |
| 5 | 50% DAP, 50% diacetone acrylamide | 70:30 |
| 6 | 100% diacetone acrylamide | 70:30 |
| 7 | 100% DAP | 80:20 |
| 8 | 50% DAP, 50% diacetone acrylamide | 80:20 |
| 9 | 100% diacetone acrylamide | 80:20 |

Laminates are prepared from the "prepregs" by stacking 17 layers of impregnated fabric, with fibers in adjacent layers being disposed perpendicularly, and molding at 150° C. and 300 p.s.i. for 5 minutes, 10 minutes and 15 minutes. The laminates are then cooled rapidly under pressure. It is found initially that, especially at high monomer ratios such as 40 percent, the "prepregs" with 100 percent DAP show severe blocking and are extremely tacky. Substitution of diacetone acrylamide for part or all of the DAP materially decreases blocking tendencies, and the resin containing only diacetone acrylamide is completely nontacky. It is further found that the required curing time for a diacetone acrylamide-containing "prepreg" is substantially less than that for one in which only DAP is used.

The molded laminates are tested for the following physical properties: Barcol hardness (ASTM D2583), percent water absorption (ASTM D570), Izod impact strength (ASTM D256), flexural strength and modulus (ASTM D790) and tensile strength (ASTM D638). The results are given in Table II.

The effect of cross-linking medium composition on physical properties is evident; laminates containing only DAP are slow to cure and consequently have inferior physical properties after a 5-minute curing time, while those containing diacetone acrylamide are completely cured after 5 minutes and have excellent properties.

A comparison of electrical properties (surface and volume resistivity, dielectric strength, dielectric constant and dissipation factor) of the laminates of Examples 1–9 shows that those containing diacetone acrylamide are comparable to those containing DAP, under both dry and wet conditions.

Curable compositions of this invention which contain high percentages of diacetone acrylamide can be made to flow from a "prepreg" onto a substrate and cure thereon by applying heating means, such as a household steam iron, and using a release paper or the like between heating means and the "prepreg." This procedure offers a simple method for forming cross-linked, resinous coatings or adhesive joints.

Diacetone acrylamide may also be substituted for styrene or methyl methacrylate in curable polyester compositions. Prolonged exposure tests show that the rate of yellowing of diacetone acrylamide-crosslinked laminates is considerably lower than that of methyl methacrylate-cross-linked ones.

Similar advantages are obtained from the use of diacetone acrylamide or other N-3-oxohydrocarbon-substituted acrylamides in paper-reinforced laminates and those containing other reinforcing agents.

Diacetone acrylamide may also be substituted for cross-linking monomers such as styrene, diallyl phthalate or methyl methacrylate in polyester premixes. In physical premixes as described hereinabove, the polyester, monomer, polymerization catalyst and inhibitor are blended with a particulate filler. The procedures used and the compositions thus obtained are believed to be so familiar to those skilled in the art that no detailed discussion of them is necessary.

For the formation of chemically thickened premixes, the polyester-monomer mixture is reacted with a metal salt or hydroxide in proportions of about 10–40 parts by weight per 100 parts of said mixture, to form a B-stage resin. Upon initiation of the cross-linking reaction, this B-stage resin is then cross-linked to form the infusible product.

The metal salt of hydroxide is usually derived from a Group II metal such as calcium, magnesium, barium or zinc. The hydroxide, especially calcium hydroxide (lime), is preferred and it may be used in solid form. However,

TABLE II

| Example | Molding time, min. | Barcol hardness | Percent water absorption | Impact strength, ft.-lb./in. notch | Flexural strength, p.s.i. | Flexural modulus, p.s.i. ($\times 10^6$) | Tensil strength, p.s.i. |
|---|---|---|---|---|---|---|---|
| 1(a) | 5 | 53 | 0.16 | 21.9 | 47,199 | 3,703 | 47,700 |
| 1(b) | 10 | 73 | 0.13 | 22 | 81,409 | 4,490 | 54,547 |
| 1(c) | 15 | 75 | 0.13 | 19.1 | 75,484 | 4,279 | 54,310 |
| 2(a) | 5 | 75 | 0.05 | 22.3 | 79,857 | 4,476 | 54,470 |
| 2(b) | 10 | 77 | 0.06 | 22.6 | 84,290 | 4,317 | 56,765 |
| 2(c) | 15 | 77 | 0.05 | 26.7 | 82,129 | 4,306 | 56,745 |
| 3(a) | 5 | 71 | 0.05 | 25.6 | 76,312 | 4,265 | 52,669 |
| 3(b) | 10 | 73 | 0.06 | 23.8 | 77,958 | 4,047 | 59,315 |
| 3(c) | 15 | 74 | 0.06 | 22.3 | 82,258 | 4,656 | 56,345 |
| 4(a) | 5 | 70 | 0.05 | 23.1 | 66,450 | 4,582 | 62,700 |
| 4(b) | 10 | 77 | 0.04 | 24.8 | 87,150 | 4,678 | 65,900 |
| 4(c) | 15 | 77 | 0.06 | 21.4 | 85,800 | 4,963 | 63,550 |
| 5(a) | 5 | 78 | 0.03 | 21.6 | 87,975 | 5,329 | 64,050 |
| 5(b) | 10 | 77 | 0.04 | 23.7 | 88,270 | 4,596 | 63,100 |
| 5(c) | 15 | 78 | 0.04 | 22.2 | 95,000 | 4,737 | 60,200 |
| 6(a) | 5 | 75 | 0.04 | 22.0 | 83,400 | 4,184 | 61,750 |
| 6(b) | 10 | 73 | 0.04 | 21.3 | 82,050 | 4,505 | 63,450 |
| 6(c) | 15 | 77 | 0.04 | 21.0 | 84,100 | 4,288 | 65,500 |
| 7(a) | 5 | 70 | 0.06 | 27.0 | 63,350 | 3,898 | 59,700 |
| 7(b) | 10 | 76 | 0.05 | 28.0 | 77,750 | 4,438 | 57,495 |
| 7(c) | 15 | 76 | 0.04 | 26.2 | 84,075 | 3,997 | 64,830 |
| 8(a) | 5 | 75 | 0.04 | 26.7 | 74,375 | 4,310 | 53,400 |
| 8(b) | 10 | 74 | 0.03 | 25.8 | 75,900 | 3,997 | 58,140 |
| 8(c) | 15 | 77 | 0.03 | 27.0 | 89,750 | 4,356 | 61,930 |
| 9(a) | 5 | 70 | 0.04 | [1] 33.3 | 54,250 | 1,608 | 39,055 |
| 9(b) | 10 | 73 | 0.03 | 28.7 | 72,750 | 4,150 | 48,375 |
| 9(c) | 15 | 74 | 0.04 | 25.9 | 87,550 | 4,096 | 58,465 |

[1] Delaminated.

it is frequently advantageous to suspend it in a suitable plasticizer such as diallyl phthalate or a dialkyl phthalate (e.g., diethyl phthalate). A small amount of dispersing acid such as oleic acid may be used to keep the salt-plasticizer mixture homogeneous.

The formation of the B-stage resin is inhibited by diacetone acrylamide. Thus, it may take several days under ordinary conditions for the resin to set up when the cross-linking monomer is diacetone acrylamide. It has been found that the time required for B-stage resin formation may be regulated by the addition of an acid to the reaction mixture in varying proportions. Weak inorganic and simple organic acids such as phosphoric, acetic, propionic, oleic or the like may be used, but it is generally preferred to use a polymerizable unsaturated acid such as acrylic, methacrylic or maleic since such an acid will be chemically incorporated into the resin rather than remaining separate as an impurity therein. The amount of acid preferred is about 10–35 parts by weight per 100 parts of polyester-monomer mixture.

The formation of chemically thickened premixes according to this invention is exemplified by a procedure in which a polyester is formed by reacting 9 moles of neopentyl glycol with 2.5 moles of phthalic anhydride and 5 moles of maleic anhydride at 85°–180° C. under nitrogen for about one-half hour, with removal of water by distillation, and reacting the intermediate thus formed with 1 mole of phosphorus pentoxide at 100°–200° C. under nitrogen for about 1 hour. To the polyester thus formed is added 0.183 part of catechol as a polymerization inhibitor, followed by 1,220 parts (7.2 moles) of diacetone acrylamide.

Fifty parts by weight of the above-described polyester is mixed with 15 parts of a mixture containing 50 percent lime, 47 percent diallyl phthalate and 3 percent oleic acid. The resulting mixture is liquid and does not thicken to the B-stage for many days. The addition of five parts of methacrylic acid, however, causes an almost immediate exothermic reaction with thickening and the formation of a B-stage resin over a few days. A mixture of 50 parts of the polyester, 20 parts of the lime-diallyl phthalate-oleic acid mixture and nine parts of methacrylic acid forms a B-stage resin within 5–10 minutes. These resins may then be cured by ordinary techniques. Similar results are obtained when acrylic acid or maleic acid is substituted for the methacrylic acid. Chemically thickened premixes as described above, and compositions used in their preparation, are not part of my invention but were invented by John Bretz and are disclosed and claimed by him in copending application Ser. No. 877,040, filed Nov. 14, 1969.

Still another application of the curable compositions of this invention is in radiation-cured coatings. Such coatings may be formed by spreading the polyester-monomer mixture over the surface to be coated, typically to a thickness of about 3 mils or less, and passing a beam of electrons, or of radioactively produced particles (e.g., from a radioactive cobalt source) into the coating. The method is described in detail as to its general applicability in U.S. Pat. No. 3,247,012, the disclosure of which is incorporated by reference herein.

What is claimed is:

1. A curable composition of matter comprising an unsaturated polyester and a cross-linking medium consisting essentially of (A) about 30–100 percent by weight of a monomeric N-3-oxohydrocarbon-substituted acrylamide of the formula

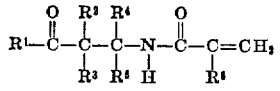

wherein each of $R^1$, $R^2$, $R^3$, $R^4$ and $R^5$ is hydrogen or a lower hydrocarbon radical and $R^6$ is hydrogen or a lower alkyl radical, and (B) about 0–70 percent by weight of a second monomer capable of cross-linking said polyester.

2. A composition according to claim 1 wherein the N-3-oxohydrocarbon - substituted acrylamide is N-(1,1-dimethyl-3-oxobutyl)acrylamide.

3. A composition according to claim 2 which additionally contains a free radical polymerization catalysts.

4. A composition according to claim 3 wherein component B is styrene or diallyl phthalate.

5. A composition according to claim 3 wherein the polyester is prepared by reacting about 2.0–2.5 moles of a diol or polyol with about 0.4–2.0 moles of an unsaturated, polymerizable dicarboxylic or polycarboxylic acid or anhydride thereof and about 0–1.6 moles of a non-polymerizable dicarboxylic or polycarboxylic acid or anhydride thereof.

6. A composition according to claim 5 wherein the cross-linking medium consists of component A.

7. A cross-linked polymeric composition of matter prepared by reacting the curable composition of claim 1 with a free radical polymerization catalyst.

8. A cross-linked polymeric composition of matter prepared by contacting the curable composition of claim 1 with a beam of electrons or radioactively produced particles.

9. A cross-linked polymeric composition of matter prepared by reacting the curable composition of claim 2 with a free radical polymerization catalyst.

10. A cross-linked polymeric composition of matter prepared by contacting the curable composition of claim 2 with a beam of electrons or radioactively produced particles.

11. A cross-linked composition according to claim 9 which additionally contains an inert reinforcing agent.

12. A cross-linked polymeric composition of matter prepared by polymerizing the curable composition of claim 5.

13. A cross-linked composition according to claim 12 which additionally contains an inert reinforcing agent.

*14. A composition according to claim 1 wherein the cross-linking medium consists of component A which is present in excess and which serves as a solvent for the polyester at temperatures of at least about 50° C., said composition being otherwise solvent-free.*

*15. A composition according to claim 14 wherein the N-3-oxohydrocarbon-substituted acrylamide is N-(1,1-dimethyl-3-oxobutyl)acrylamide.*

*16. A composition according to claim 15 which additionally contains a free radical polymerization catalyst.*

*17. A composition according to claim 16 wherein the polyester is prepared by reacting about 2.0–2.5 moles of a diol or polyol with about 0.4–2.0 moles of an unsaturated, polymerizable dicarboxylic or polycarboxylic acid or anhydride thereof and about 0–1.6 moles of a non-polymerizable dicarboxylic or polycarboxylic acid or anhydride thereof.*

*18. A crosslinked polymeric composition of matter prepared by reacting the curable composition of claim 14 with a free radical polymerization catalyst.*

*19. A crosslinked polymeric composition of matter prepared by contacting the curable composition of claim 14 with a beam of electrons or radioactively produced particles.*

*20. A crosslinked polymeric composition of matter prepared by reacting the curable composition of claim 15 with a free radical polymerization catalyst.*

*21. A crosslinked polymeric composition of matter prepared by contacting the curable composition of claim 15 with a beam of electrons or radioactively produced particles.*

*22. A crosslinked composition according to claim 20 which additionally contains an inert reinforcing agent.*

*23. A crosslinked polymeric composition of matter prepared by polymerizing the curable composition of claim 17.*

*24. A crosslinked composition according to claim 23 which additionally contains an inert reinforcing agent.*

(References on following page)

References Cited

The following references, cited by the Examiner, are of record in the patented file of this patent or the original patent.

UNITED STATES PATENTS

| | | | |
|---|---|---|---|
| 2,598,663 | 6/1952 | Kropa | 154—43 |
| 2,951,820 | 9/1960 | Dreschel | 260—22 |
| 3,277,056 | 10/1966 | Coleman | 260—63 |
| 3,341,455 | 9/1967 | Coleman | 252—51.5 |

FOREIGN PATENTS

| | | |
|---|---|---|
| 1,154,310 | 10/1957 | France. |

OTHER REFERENCES

Boenig, Unsaturated Polyesters, Elsevier, N.Y., 1964, pp. 166–68.

MELVIN GOLDSTEIN, Primary Examiner

U.S. Cl. X.R.

161—195, 232, DIG. 4; 260—40 R, 863, 868, 869, 870, 872